(12) United States Patent
Lee

(10) Patent No.: US 8,102,826 B2
(45) Date of Patent: Jan. 24, 2012

(54) MOBILE COMMUNICATION TERMINAL FOR PROVIDING AD-HOC NETWORK SERVICE AND METHOD FOR MANAGING AD-HOC NETWORK USING THE SAME

(75) Inventor: Soo Hyeong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 957 days.

(21) Appl. No.: 11/804,108

(22) Filed: May 17, 2007

(65) Prior Publication Data

US 2007/0291722 A1   Dec. 20, 2007

(30) Foreign Application Priority Data

Jun. 19, 2006   (KR) .................. 10-2006-0054744

(51) Int. Cl.
*H04W 4/00* (2009.01)
(52) U.S. Cl. ............... 370/338; 455/426.1; 455/500; 455/509; 455/515; 455/516; 370/328; 370/392; 370/395.31; 370/431; 370/432
(58) Field of Classification Search .......... 370/235, 370/236, 237, 238, 255, 277, 349, 351, 389, 370/392, 393, 400, 406–410, 390, 396, 397, 370/395.3, 395.31, 431, 432, 475; 455/435.1–435.3, 455/445, 41.2, 500, 507–517, 450–452.2
See application file for complete search history.

(56) References Cited

U.S. PATENT DOCUMENTS

| | | | | |
|---|---|---|---|---|
| 2002/0009199 | A1* | 1/2002 | Ala-Laurila et al. | 380/247 |
| 2003/0018774 | A1* | 1/2003 | Flinck et al. | 709/223 |
| 2003/0235174 | A1 | 12/2003 | Pichna et al. | |
| 2004/0233847 | A1 | 11/2004 | Park et al. | |
| 2005/0135286 | A1* | 6/2005 | Nurminen et al. | 370/310 |
| 2005/0152396 | A1 | 7/2005 | Pichna et al. | |
| 2005/0232281 | A1* | 10/2005 | Rosenzweig et al. | 370/400 |
| 2006/0013160 | A1 | 1/2006 | Haartsen | |
| 2006/0040670 | A1 | 2/2006 | Li et al. | |
| 2006/0080462 | A1* | 4/2006 | Asnis | 709/238 |
| 2007/0060143 | A1* | 3/2007 | Bhatti | 455/445 |
| 2007/0127419 | A1* | 6/2007 | Sapek | 370/338 |
| 2007/0230421 | A1* | 10/2007 | Roadknight | 370/338 |

FOREIGN PATENT DOCUMENTS

| | | |
|---|---|---|
| CN | 1602077 | 3/2005 |
| CN | 1663198 | 8/2005 |
| WO | WO 2006/000239 | 1/2006 |

* cited by examiner

Primary Examiner — Kamran Afshar
Assistant Examiner — Neda Behrooz
(74) Attorney, Agent, or Firm — The Farrell Law Firm, P.C.

(57) ABSTRACT

A method for managing an ad-hoc network using a mobile communication terminal is disclosed. The method includes creating an address table that stores ad-hoc network addresses of the mobile communication terminals and a routing table that stores routing information of the terminals, allocating an address to a first mobile communication terminal and storing the result in the address table, receiving topology change information of the ad-hoc network from the first terminal, updating the routing table and then transmitting it to the first terminal and other ad-hoc network participating terminals. Since the ad-hoc network is managed using the mobile communication network system, the mobile communication network and the ad-hoc network are all effectively managed.

15 Claims, 6 Drawing Sheets

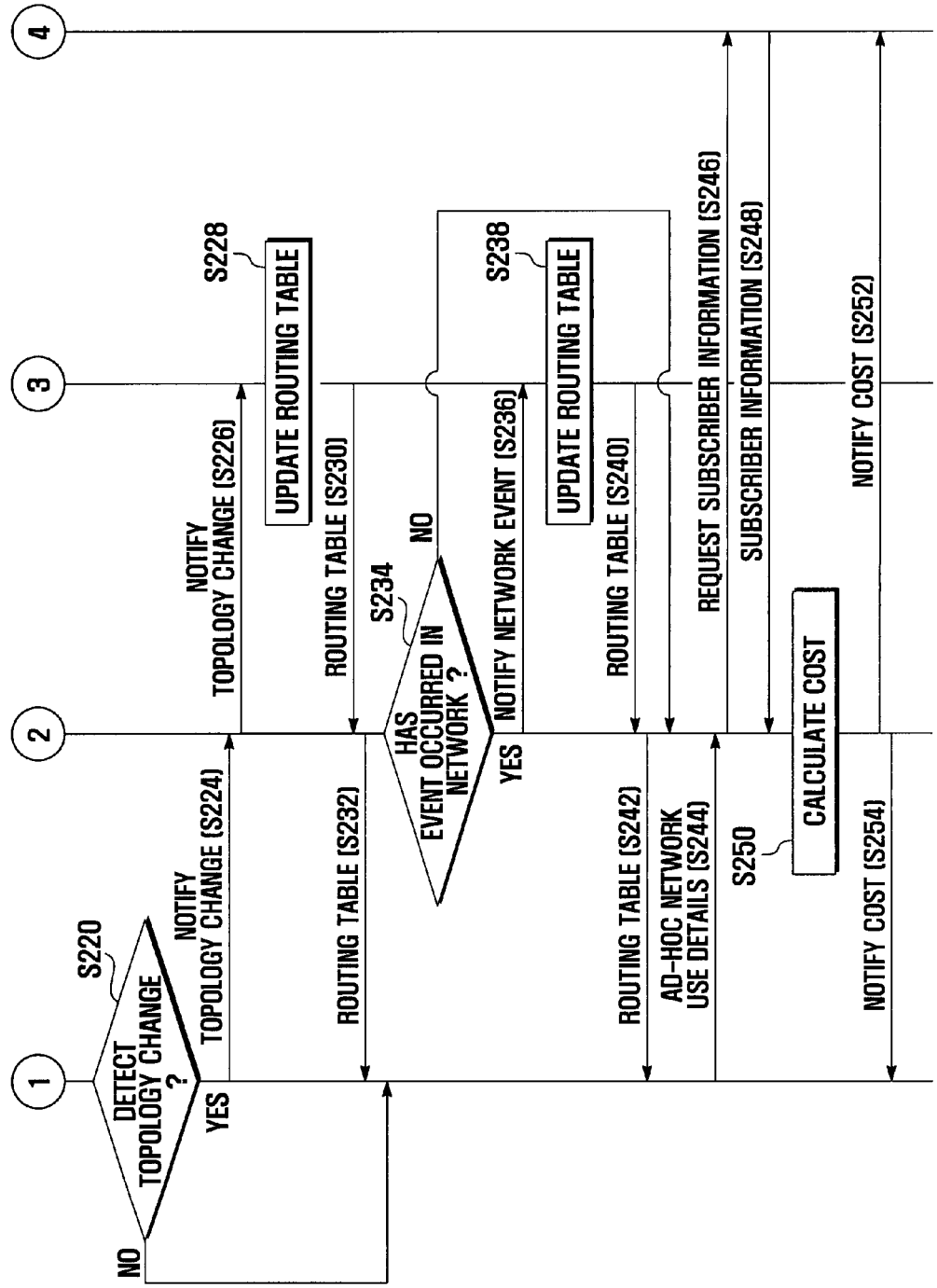

| NO | MIN | ESN | USE OF AD-HOC NETWORK | COST |
|---|---|---|---|---|
| 1 | 010-1234-5678 | R65Y603210 | YES | 386 |
| 2 | 010-1112-7775 | Y46278A5CD | NO | null |
| 3 | 010-1235-1111 | R123456789 | YES | 1.050 |
| ⋮ | ⋮ | ⋮ | ⋮ | ⋮ |

| NO | MIN | IP ADDRESS |
|---|---|---|
| 1 | 010-1234-5678 | 126. 501. 5. 123 |
| 2 | 011-1235-1111 | 126. 501. 5. 127 |
| ⋮ | ⋮ | ⋮ |

| SOURCE IP | DESTINATION IP | NEXT IP | NUMBER OF HOP |
|---|---|---|---|
| A | D | B | 3 |
| ⋮ | ⋮ | ⋮ | ⋮ |
| B | D | C | 2 |
| ⋮ | ⋮ | ⋮ | ⋮ |
| C | D | null | 1 |
| ⋮ | ⋮ | ⋮ | ⋮ |

MOBILE COMMUNICATION TERMINAL FOR PROVIDING AD-HOC NETWORK SERVICE AND METHOD FOR MANAGING AD-HOC NETWORK USING THE SAME

PRIORITY

This application claims priority to an application entitled "MOBILE COMMUNICATION TERMINAL FOR PROVIDING AD-HOC NETWORK SERVICE AND METHOD FOR MANAGING AD-HOC NETWORK USING THE SAME" filed in the Korean Intellectual Property Office on Jun. 19, 2006 and assigned Serial No. 2006-0054744, the contents of which are incorporated herein by reference.

BACKGROUND OF THE INVENTION

1. Field of the Invention

The present invention relates generally to a mobile communication terminal for providing an ad-hoc network service and a method for managing an ad-hoc network using the same. More particularly, this invention relates to a dual mode mobile communication terminal that can support a mobile communication network (e.g., a cellular network) service and an ad-hoc network service, and to a method for managing an ad-hoc network formed among such mobile communication terminals.

2. Description of the Related Art

With the development of mobile communication technology related to mobile communication terminals (e.g., mobile phones, Personal Digital Assistants (PDAs), and laptop computers), such terminals now employ a variety of functions. For example, a mobile phone could only provide wireless voice calling in its early stages of development, but now can support transmission of text and images in addition to voice calling.

Particularly, as technology for loading memory, which can store large multimedia files (e.g., moving images and music video) and data transmission technology are developed, a mobile communication terminal can now transmit/receive such multimedia files to/from other mobile communication terminals.

As such, while a variety of functions are added to mobile communication terminals, a communication method has been proposed by which mobile communication terminals can communicate with each other without passing through a mobile communication network such as a cellular network. Examples of such a communication method are 802.11 WiFi, 802.15 Wireless Personal Area Network (WPAN), Bluetooth®, Ultra Wide Band (UWB), Zigbee®, Infrared (IR) and 802.16 Wireless Metropolitan Area Network (WMAN).

An ad-hoc network refers to a network in which moving nodes (e.g., mobile communication terminals) having wireless interfaces autonomously communicate with each other using the above listed communication methods. That is, in the ad-hoc network, the moving nodes are connected to each other through a plurality of hops and then perform communication. Each moving node functions as an end node (e.g., a host) or an intermediate node (e.g., a router). Therefore, although a node intended to communicate with another node (where they are referred to as 'ad-hoc network participation node' or 'ad-hoc network participants') is not directly or indirectly connected to another node through a physical wireless link, the ad-hoc network allows the ad-hoc network participants to communicate with each other though other nodes.

In addition, the ad-hoc network allows the ad-hoc network participants to voluntarily set each other and to freely participate or secede to/from the network. However, the ad-hoc network has restrictions due to its energy sources, since it is battery operated. Also, the ad-hoc network causes frequent environment variations (e.g., since the participation nodes are moved) according to wireless network characteristics. Therefore, the ad-hoc network has a frequently varying network topology.

Accordingly, the conventional ad-hoc network has disadvantages in that it does not handle the network management well. In particular, the conventional ad-hoc network makes it difficult to allocate addresses to nodes and manage them.

The conventional mobile communication terminal, which is connectable to both the mobile communication network and the ad-hoc network, employs a method in which Internet Protocol version 6 (IPv6) address is statically allocated. However, since the introduction of the IPv6 address has been slow, configuration of the ad-hoc network using the mobile communication terminal has also been delayed. As well, although such IPv6 address is now used, the conventional method still has a drawback in that it cannot handle frequent variations in network topology.

SUMMARY OF THE INVENTION

In order to solve the above problems, the present invention provides an apparatus and method for managing an ad-hoc network that can easily manage frequent variations in network topology.

Provided herein are an apparatus and method for managing an ad-hoc network that can efficiently manage a mobile communication network and an ad-hoc network using a conventional mobile communication network system.

Provided herein are an apparatus and method for managing an ad-hoc network that enables an ad-hoc network to be easily managed and to thus create new beneficial models.

In accordance with an aspect of the present invention, there is provided a method for managing an ad-hoc network of a mobile communication system that provides mobile communication services to one or more mobile communication terminals. The method includes creating an address table that stores addresses of the mobile communication terminals, which are participating in the ad-hoc network, in the mobile communication system, and a routing table that stores routing information among the mobile communication terminals, receiving an address request message from a first mobile communication terminal intended to participate in the ad-hoc network, allocating an address to the first mobile communication terminal in response to the address request and storing the result in the address table, updating the routing table using routing information updated according to the address allocation, receiving topology change information of the ad-hoc network from the first mobile communication terminal, updating the routing table using the topology change information and then transmitting the routing table to the first mobile communication terminal, and transmitting the routing table to other mobile communication terminals participating in the ad-hoc network in which the first mobile communication terminal has participated.

The address table may store identification information of the mobile communication terminals and addresses matched with the identification information. The addresses are allocated to the mobile communication terminals so that the mobile communication terminals can participate in the ad-hoc network.

The identification information of the mobile communication terminals is a Mobile Identification Number (MIN) of the mobile communication terminals.

The routing table stores all routing information with respect to all the mobile communication terminals participating in the ad-hoc network, in which one of the mobile communication terminals, defined as a source, is routed to the others defined as a destination, which is performed for the respective mobile communication terminals.

The routing table may store an address of a source mobile communication terminal, an address of a destination mobile communication terminal, an address of a mobile communication terminal adjacent to the source mobile communication terminal toward the destination mobile communication terminal and the number of hops from the source mobile communication terminal to the destination mobile communication terminal, with respect to all link paths among the mobile communication terminals that exist in the ad-hoc network.

According to the present invention, allocating an address to the first mobile communication terminal in response to the address request and storing the result in the address table, further may include checking subscriber information of the first mobile communication terminal and determining as to whether a user of the first mobile communication terminal subscribes to ad-hoc network services. Here, an address is allocated to the first mobile communication terminal only if the user of the first mobile communication terminal subscribes to the ad-hoc network services based on the determination.

The method may further include, when an ad-hoc network topology change has occurred according to a mobile communication network state change, updating the routing table using information of the topology change, and transmitting the routing table to all the mobile communication terminals participating in the ad-hoc network.

The method may further include billing use cost of the ad-hoc network to the first mobile communication terminal using ad-hoc network use details information periodically transmitted from the first mobile communication terminal.

In accordance with an aspect of the present invention, provided is a mobile communication terminal that includes a user interface unit for inputting a user's ad-hoc network participation request signal for participating in an ad-hoc network, a mobile communication module for communicating with a mobile communication network system providing mobile communication network services and receiving an allocated ad-hoc network address from the mobile communication network system in response to the ad-hoc network participation request signal, an ad-hoc module participating in the ad-hoc network using the ad-hoc network address, and a controller for receiving ad-hoc network use details from the ad-hoc module and periodically transmitting the ad-hoc network use details to the mobile communication network system through the mobile communication module.

The ad-hoc network module outputs a control message for searching for an ad-hoc network participant, and determines ad-hoc network topology change information based on a response message transmitted from another mobile communication terminal having received the control message. Also, the controller transmits the ad-hoc network topology change information to the mobile communication network system through the mobile communication module.

The mobile communication module may receive a routing table, updated by the ad-hoc network topology change information, from the mobile communication network system, and then transmit it to the controller.

The mobile communication module may receive a routing table, updated by another mobile communication terminal participating in the ad-hoc network, from the mobile communication network system, and then transmit it to the controller.

The mobile communication module may receive a routing table, updated by the mobile communication network system itself according to the mobile communication network state change, from the mobile communication network system, and then transmit it to the controller.

The ad-hoc module may be connected to other mobile communication terminals participating in the ad-hoc network, through the ad-hoc network, based on the received routing table.

The mobile communication module may receive cost information according to the ad-hoc network use details from the mobile communication network system and then transmit it to the controller.

BRIEF DESCRIPTION OF THE DRAWINGS

The above and other features and advantages of the present invention will be more apparent from the following detailed description in conjunction with the accompanying drawings, in which:

FIG. 2A-2B illustrate a procedure for managing an ad-hoc network according to the present invention;

FIG. 3 illustrates a subscriber information table for managing an ad-hoc network according to the present invention;

FIG. 4 illustrates an ad-hoc network address table according to the present invention;

FIG. 5B describes a routing process according to the routing table of FIG. 5A.

DETAILED DESCRIPTION OF THE PREFERRED EMBODIMENTS

Figure 1:
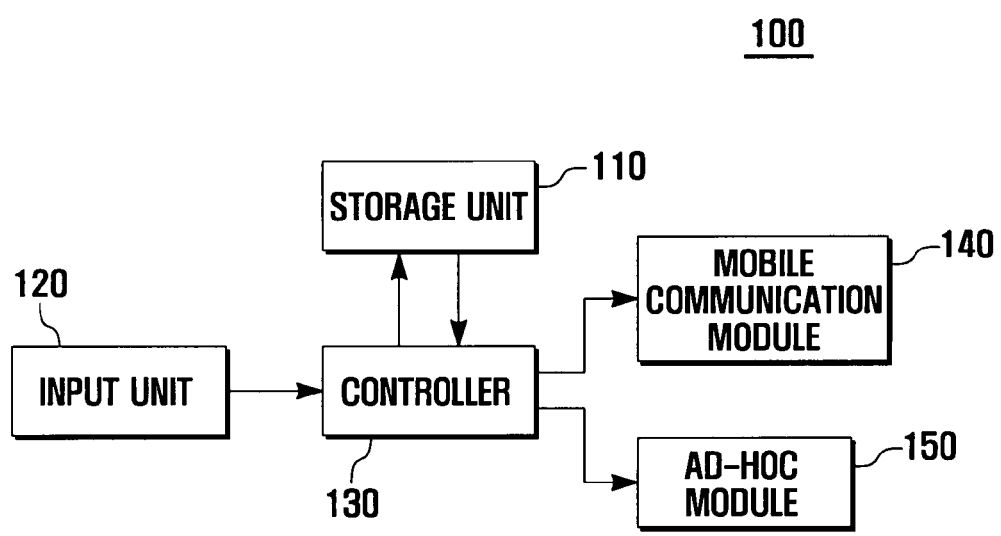
FIG. 1 illustrates a mobile communication terminal according to the present invention.

Hereinafter, preferred embodiments of the present invention are described in detail with reference to the accompanying drawings. In the drawings, the same or similar elements are denoted by the same reference numerals even though they are depicted in different drawings. In the following description, a detailed description of known functions and configurations incorporated herein will be omitted for the sake of clarity and conciseness.

FIG. 1 illustrates a mobile communication terminal according to the present invention. Referring to FIG. 1, the mobile communication terminal 100 includes a storage unit 110, an input unit 120, a controller 130, a mobile communication module 140 and an ad-hoc module 150.

The storage unit 110 stores information related to operations of the mobile communication terminal 100, such as a drive program for system control and data associated with the drive program. In particular, the storage unit 110 stores an ad-hoc network address that the mobile communication terminal 100 requires to participate in an ad-hoc network.

The input unit 120 interfaces with a user to control operations of the mobile communication terminal 100. That is, the input unit 120 inputs an operation signal from the user to transmit it to the controller 130. In particular, the input unit 120 preferably inputs a user's ad-hoc network participation request signal for participating in the ad-hoc network and transmits it to the controller 130.

The controller 130 controls the mobile communication terminal 100 based on the signal inputted through the input unit 120 or a previously stored drive program. For example, the controller 130 transmits an ad-hoc network address, received through the mobile communication module 140, to the ad-hoc module 150, or transmits ad-hoc network use details information, transmitted from the ad-hoc module 150, to the mobile communication network system through the mobile communication module 140.

In particular, the controller 130 performs periodic transmission of this ad-hoc network use details information. Such periodic transmission enables the mobile communication network system to calculate use cost of the ad-hoc network based the ad-hoc network use details information. That is, as each mobile communication terminal obligatorily transmits its ah-hoc network use details information to the mobile communication network system, the mobile communication network system can charge amounts corresponding to the ad-hoc network use based on the ad-hoc network use details information.

The mobile communication module 140 communicates with the mobile communication network system that provides mobile communication network services, and receives an allocated ad-hoc network address from the mobile communication network system in response to the ad-hoc network participation request signal. The ad-hoc network address is stored in the storage unit 110 according to the control of the controller 130.

Also, the mobile communication module 140 receives a routing table from the mobile communication system, updated by a change of information in the ad-hoc network topology, a routing table updated by other mobile communication terminals participating in the ad-hoc network, or a routing table updated by the mobile communication network system itself according to a change in the mobile communication network state, and then transmits it to the controller 130.

In addition, the mobile communication module 140 receives cost information according to the ad-hoc network use details from the mobile communication network system. The mobile communication module 140 transmits the received cost information to the controller 130.

The ad-hoc module 150 participates in the ad-hoc network using the ad-hoc network address received through the mobile communication module 140. The ad-hoc module 150 outputs a control message for searching for an ad-hoc network participant, and receives a response message outputted from another mobile communication terminal having received the control message. That is, 'neighbor discovery' is preferably exchanged therebetween. The 'neighbor discovery' refers to an Internet Control Message Protocol (ICMP) message that hosts transmit and receive to and from each other within an ad-hoc group to determine ad-hoc network topology.

Specifically, the ad-hoc module 150 transmits the ICMP message including information of the mobile communication terminal 100 (e.g., Mobile Identification Number (MIN) or Electronic Serial Number (ESN)) over the ad-hoc network. If a response message is received in response to the ICMP message, the ad-hoc module 150 determines a transmitter having transmitted the response message. That is, the ad-hoc module 150 determines that the transmitter is participating in the same ad-hoc network.

When the ad-hoc network participant changes, it is determined that ad-hoc network topology changed. Therefore, the controller 130 transmits the information of the changed ad-hoc network topology to the mobile communication network system through the mobile communication module 150.

Also, the ad-hoc module 150 is preferably connected to other mobile communication terminals, participating in the ad-hoc network, through the ad-hoc network based on the routing table received thorough the mobile communication module 140.

Figure 2A:
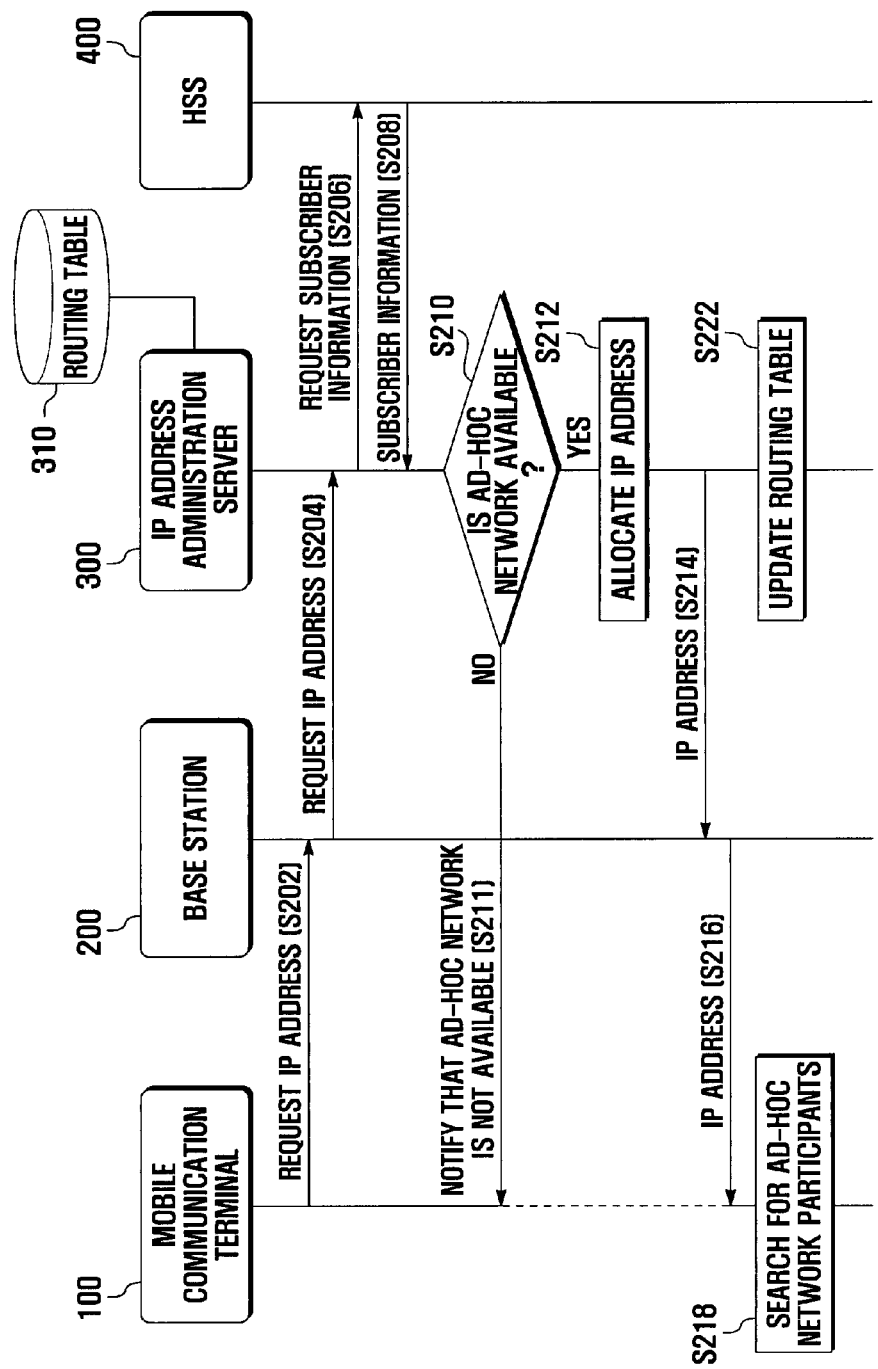

FIG. 2A-2B illustrate a procedure for managing an ad-hoc network according to the present invention, in which the ad-hoc network including the mobile communication terminal 100 of FIG. 1 as a node is managed by a mobile communication network system.

As shown in FIG. 2A-2B, the mobile communication network system includes a base station 200 providing mobile communication services to the mobile communication terminal 100, an IP address administration server 300 managing IP addresses to be used in the ad-hoc network, and a Home Subscription Server (HSS) 400. Here, the IP address administration server 300 preferably stores an address table (not shown) for storing addresses of mobile communication terminals participating in the ad-hoc network, and a routing table 310 for storing routing information between mobile communication terminals over the ad-hoc network.

Referring to FIGS. 1 and 2, the method for managing an ad-hoc network according to the present invention will be described as follows.

When the mobile communication terminal 100 requests an IP address to be used in an ad-hoc network (S202), the base station 200 transmits the request message to the IP address administration server 300 (S204). The IP address administration server 300 requests subscriber information from the HSS 400 (S206). Here, the HSS 400 refers to an apparatus that manages information about subscribers to mobile communication network services. The HSS 400 manages personal information, mobile communication terminal information, additional service subscription information and billing information of subscribers. To manage the subscriber information, the subscriber information table stored in the HSS 400 is described in FIG. 3, and will be described later in detail.

Also, the request of subscriber information from the HSS 400 in S206 is to determine whether the user of the mobile communication terminal 100 subscribes in the ad-hoc network service.

When receiving the subscriber information on the user of the mobile communication terminal 100 from the HSS 400 (S208), the IP address administration server 300 analyzes it and then determines whether the ad-hoc network is available to the user (S210). If the user cannot use the ad-hoc network, as determined in S210, the IP address administration server 300 notifies the mobile communication terminal 100 that the ad-hoc network is not available (S211). If the user can use the ad-hoc network, as determined in S210, the IP address administration server 300 allocates an IP address to the mobile communication terminal 100 (S212), and then transmits it to the mobile communication terminal 100 via the base station 200 (S214, S216). After that, the IP address is registered in an address table (not shown), associating with identification information of the mobile communication terminal 100, and then a routing table 310 is updated using routing information (S222), which was updated according to the allocated address. Here, the address table and the routing table 310 are illustrated in FIGS. 4 and 5, respectively, and will be described later in detail.

When receiving the IP address participating in the ad-hoc network via the base station 200, the mobile communication terminal 100 searches for an ad-hoc network participant that is using it (S218). To this end, the mobile communication terminal 100 preferably outputs a control message to search for an ad-hoc network participant, and receives a response message from another mobile communication terminal having received the control message. That is, the 'neighbor discovery' is exchanged therebetween, as discussed above with respect to FIG. 1.

Specifically, the ad-hoc module 150 transmits the ICMP message including information of the mobile communication terminal 100 over the ad-hoc network. If a response message is received in response to the ICMP message, the ad-hoc module 150 determines a transmitter having transmitted the response message. That is, the ad-hoc module 150 determines the transmitter as a participant in the same ad-hoc network. When the ad-hoc network participant changes, it is determined that ad-hoc network topology changed.

When detecting the topology change from the determination (S220), the mobile communication terminal 100 notifies the IP address administration server 300 of the topology change through the base station 200 (S224, S226). The mobile communication terminal 100 preferably transmits information of the topology change to the IP address administration server 300, as well.

Next, the IP address administration server 300 updates the routing table 310 using the topology change information (S228) and then transmits it to the mobile communication terminal 100 via the base station 200 (S230, S232).

The base station 200 preferably transmits the routing table 310 to other mobile communication terminals participating in the ad-hoc network in which the mobile communication terminal 100 has participated.

If an event has occurred (S234), the base station 200 notifies the IP address administration server 300 of the event (S236). Here, the event refers to a cause of a change in ad-hoc network topology from the mobile communication network, and cites examples, such as traffic relocation according to the time of a call, or off state detection of a mobile communication terminal that is participating in the ad-hoc network. The base station 200 preferably transmits the topology change information due to the event to the IP address administration server 300, together with the event.

Next, the IP address administration server 300 updates the routing table 310 using the topology change information (S238), and then transmits it to the mobile communication terminal 100 via the base station 200 (S240, S242). The base station 200 preferably transmits the routing table 310 to other mobile communication terminals participating in the ad-hoc network in which the mobile communication terminal 100 has participated.

When receiving ad-hoc network use details from the mobile communication terminal 100 (S244), the base station 200 requests subscriber information on the mobile communication terminal 100 from the HSS 400 (S246) and then receives the subscriber information from the HSS 400 in response to the request (S248). After that, the base station 200 calculates cost based on the subscriber information and the ad-hoc network use details information transmitted from the mobile communication terminal 100 (S250). The process of S250 is to determine the use cost, which the mobile communication terminal 100 has accumulated in the ad-hoc network, to charge to the user of the mobile communication terminal 100.

Here, the subscriber information of the user of the mobile communication terminal 100 is requested such that the cost can be calculated according to users' service subscription conditions.

After that, the base station 200 notifies the HSS 400 and the mobile communication terminal 100 of the calculation result of S250 (S252, S254).

The HSS 400 manages the cost according to subscriber information of the corresponding subscriber. For example, the HSS 400 associates the cost with subscriber information of the corresponding subscriber, thereby managing the cost payment details information of the corresponding subscriber.

Then, the mobile communication terminal 100 bills the corresponding subscriber, so that the subscriber can pay.

As such, since the present invention is configured to allow the mobile communication network system to manage the ad-hoc network using the mobile communication terminal 100, the network can be collectively managed. Also, since the present invention is configured to receive topology detection results from each mobile communication terminal, frequent changes in network topology are easily managed.

FIG. 3 illustrates a subscriber information table for managing an ad-hoc network according to the present invention, which is stored in the HSS 400 of FIG. 2A-2B.

Referring to FIG. 3, the subscriber information table 410 stores information (e.g., MIN, and ESN) for identifying subscribers, indicating whether a corresponding subscriber uses an ad-hoc network, and indicating cost according to user's ad-hoc network use. FIG. 3 shows information about users whose phone numbers are 010-1234-5678, 010-1112-7775 and 010-1235-1111, respectively. As shown in FIG. 3, only the users of 010-1234-5678, and 010-1235-1111 are using the ad-hoc network, and have cost information of 386 and 1,050, respectively. Here, the cost information is preferably created as an amount of transmission/reception data or time of access to the network is accumulated for a certain period.

It will be appreciated that the subscriber information is not limited by the embodiment of FIG. 3. That is, the subscriber information may further include information about additional services' that a corresponding subscriber subscribes to and the subscriber's personal information, such as the date of the subscriber's birth.

FIG. 4 illustrates an ad-hoc network address table according to the present invention. The address table preferably stores identification information of the mobile communication terminals and addresses matched with the identification information, in which the addresses are allocated to the mobile communication terminals so that they may participate in the ad-hoc network. Also, the identification information of the mobile communication terminals is preferably a MIN of the terminals. In the address table 320 of FIG. 4, the identification information of the mobile communication terminals employs the MIN with which IP addresses are matched.

Figure 5A:
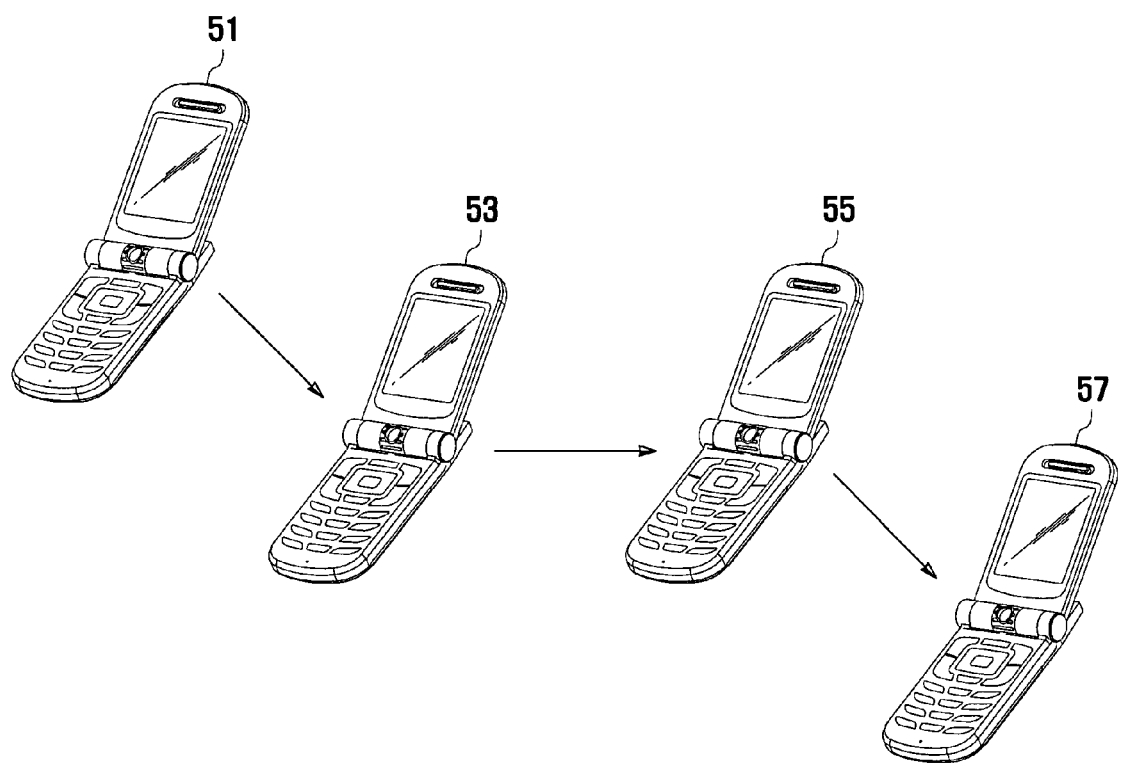
FIG. 5A illustrates a routing table for providing routing paths among ad-hoc network participants according to the present invention.

FIG. 5A illustrates a routing table for providing routing paths among ad-hoc network participants according to the present invention. The routing table preferably stores all of the routing information with respect to all the mobile communication terminals participating in the ad-hoc network. That is, one of the mobile communication terminals, defined as a source, is routed to the others defined as a destination, which is performed for the respective mobile communication terminals. Also, the routing table stores such information as an address of a source mobile communication terminal, an address of a destination mobile communication terminal, an address of a mobile communication terminal adjacent to the source mobile communication terminal toward the destination mobile communication terminal, and the number of hops from the source mobile communication terminal to the destination mobile communication terminal, with respect to all link paths among the mobile communication terminals that exist in the ad-hoc network.

Referring to FIG. 5A, with respect to the respective mobile communication terminals A, B, and C that participate in the ad-hoc network, there are paths where the respective mobile communication terminals are sources and another mobile communication terminal D is a destination. Also, the table stores an address of the mobile communication terminals adjacent to the destination mobile communication terminal D, and stores the number of hops.

FIG. 5B describes a routing process according to the routing table of FIG. 5A. As shown in FIG. 5B, when the first mobile communication terminal 51 is 'A' of FIG. 5A, the second mobile communication terminal 53 is 'B' of FIG. 5A, the third mobile communication terminal 55 is 'C' of FIG. 5A, and the fourth mobile communication terminal 'D' of FIG. 5A, ad-hoc network is linked along the arrows of FIG. 5A according to the routing information illustrated in FIG. 5B.

That is, if the ad-hoc network is linked from the first mobile communication terminal 51 to the fourth mobile communication terminals 57, the links are achieved through the second and third mobile communication terminals 53 and 55, in which the number of hops is 3.

In the embodiments of the present invention, since all of the network management is performed in the mobile communication network system as shown in FIG. 2A-2B, the ad-hoc network is systematically and conveniently managed.

As described in the foregoing, the present invention has the following advantages:

Since the ad-hoc network is managed using the mobile communication network system, the mobile communication network and the ad-hoc network are all effectively managed. Also, since topology change information transmitted from the respective mobile communication terminals is collected and, managed in the mobile communication network system, frequent change of network topology can be easily managed. Furthermore, since ad-hoc network use, details of the respective mobile communication terminals are managed in the mobile communication network system, users are billed according to the use details. That is, the present invention allows mobile communication service providers to create new beneficial models.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method for managing an ad-hoc network of a mobile communication system that provides mobile communication services to one or more mobile communication terminals, comprising:
    creating, in an address administration server of the mobile communication system, an address table that stores addresses of the mobile communication terminals which are participating in the ad-hoc network, and a routing table that stores routing information among the mobile communication terminals;
    receiving an address request message at the address administration server from a first mobile communication terminal intended to participate in the ad-hoc network;
    allocating an address to the first mobile communication terminal in response to the address request and storing the result in the address table;
    updating the routing table using routing information updated according to the address allocation;
    receiving topology change information of the ad-hoc network at the address administration server from the first mobile communication terminal;
    updating the routing table using the topology change information and then transmitting the routing table from the address administration server to the first mobile communication terminal; and
    transmitting the routing table from the address administration server to other mobile communication terminals participating in the ad-hoc network in which the first mobile communication terminal has participated.

2. The method of claim 1, wherein the address table stores identification information of the mobile communication terminals and addresses matched with the identification information, in which the addresses are allocated to the mobile communication terminals so that the mobile communication terminals can participate in the ad-hoc network.

3. The method of claim 2, wherein the identification information of the mobile communication terminals is a Mobile Identification Number (MIN) of the mobile communication terminals.

4. The method of claim 1, wherein the routing table stores all routing information with respect to all the mobile communication terminals participating in the ad-hoc network, in which the first mobile communication terminal, defined as a source, is routed to the other mobile communication terminals, each defined as a destination, which is performed for the respective mobile communication terminals.

5. The method of claim 4, wherein the routing table stores an address of a source mobile communication terminal, an address of a destination mobile communication terminal, an address of a mobile communication terminal adjacent to the source mobile communication terminal toward the destination mobile communication terminal, and a total number of hops from the source mobile communication terminal to the destination mobile communication terminal, with respect to all link paths among the mobile communication terminals that exist in the ad-hoc network.

6. The method of claim 1, wherein allocating the address to the first mobile communication terminal in response to the address request and storing the result in the address table further comprises:
    checking subscriber information of the first mobile communication terminal and determining whether a user of the first mobile communication terminal subscribes to ad-hoc network services, wherein an address is allocated to the first mobile communication terminal only if it is determined that the user of the first mobile communication terminal subscribes to the ad-hoc network services.

7. The method of claim 1, further comprising:
    updating the routing table using information of an ad-hoc network topology change when the ad-hoc network topology change has occurred according to a mobile communication network state change; and
    transmitting the routing table to all of the mobile communication terminals participating in the ad-hoc network.

8. The method of claim 1, further comprising:
    billing use cost of the ad-hoc network to the first mobile communication terminal using ad-hoc network use details information periodically transmitted from the first mobile communication terminal.

9. A mobile communication terminal comprising:
    a user interface unit for inputting a user's ad-hoc network participation request signal for participating in an ad-hoc network;
    a mobile communication module for communicating with a mobile communication network system providing mobile communication network services and receiving an allocated ad-hoc network address from an address administration server of the mobile communication network system in response to the ad-hoc network participation request signal;

an ad-hoc module participating in the ad-hoc network using the ad-hoc network address; and a controller for receiving ad-hoc network use details from the ad-hoc module and periodically transmitting the ad-hoc network use details to the address administration server of the mobile communication network system through the mobile communication module;

wherein the mobile communication module receives a routing table updated by ad-hoc network topology change information, from the address administration server.

10. The terminal of claim 9, wherein:

the ad-hoc network module outputs a control message for searching for an ad-hoc network participant, and determines the ad-hoc network topology change information based on a response message transmitted from another mobile communication terminal having received the control message; and the controller transmits the ad-hoc network topology change information to the address administration server of the mobile communication network system through the mobile communication module.

11. The terminal of claim 10, wherein the mobile communication module transmits the routing table to the controller after receiving the routing table updated by the ad-hoc network topology change information.

12. The terminal of claim 9, wherein the mobile communication module receives a routing table, updated by another mobile communication terminal participating in the ad-hoc network, from the address administration server of the mobile communication network system, and then transmits the routing table to the controller.

13. The terminal of claim 9, wherein the mobile communication module receives a routing table, updated by the mobile communication network system itself according to the mobile communication network state change, from the address administration server of the mobile communication network system, and then transmits the routing table to the controller.

14. The terminal of claim 11, wherein the ad-hoc module is connected to other mobile communication terminals participating in the ad-hoc network, through the ad-hoc network, based on the received routing table.

15. The terminal of claim 9, wherein the mobile communication module receives cost information according to the ad-hoc network use details from the mobile communication network system and then transmits the cost information to the controller.

* * * * *